US012507039B2

(12) United States Patent
Motoyama et al.

(10) Patent No.: US 12,507,039 B2
(45) Date of Patent: Dec. 23, 2025

(54) VEHICLE

(71) Applicant: SUBARU CORPORATION, Tokyo (JP)

(72) Inventors: Junichi Motoyama, Tokyo (JP); Kazuhiro Hayakawa, Tokyo (JP); Ryota Nakamura, Tokyo (JP); Tsukasa Mikuni, Tokyo (JP); Takuya Homma, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 347 days.

(21) Appl. No.: 18/455,810

(22) Filed: Aug. 25, 2023

(65) Prior Publication Data

US 2024/0089701 A1 Mar. 14, 2024

(30) Foreign Application Priority Data

Sep. 8, 2022 (JP) .................. 2022-143325

(51) Int. Cl.
*H04W 4/029* (2018.01)
*H04W 4/46* (2018.01)
*H04W 4/90* (2018.01)

(52) U.S. Cl.
CPC ............. *H04W 4/029* (2018.02); *H04W 4/46* (2018.02); *H04W 4/90* (2018.02)

(58) Field of Classification Search
CPC ........... H04W 4/90; H04W 4/40; H04W 4/44; H04W 4/46; H04W 74/0816; H04W 76/50; H04W 76/40; H04W 4/029; G08G 1/16; G08G 1/166
See application file for complete search history.

(56) References Cited

U.S. PATENT DOCUMENTS

| 10,945,116 B2* | 3/2021 | Kim .................. H04W 4/46 |
| 10,997,430 B1* | 5/2021 | Slavin .............. G06V 20/56 |
| 2007/0046457 A1* | 3/2007 | Suzuki .............. H04W 4/90 |
| | | 340/539.1 |
| 2009/0286504 A1* | 11/2009 | Krasner ............ H04M 11/04 |
| | | 455/404.1 |

(Continued)

FOREIGN PATENT DOCUMENTS

| CN | 102469627 A | * | 5/2012 | |
| CN | 104346954 A | * | 2/2015 | ............. G08G 1/205 |

(Continued)

*Primary Examiner* — Dung Hong
(74) *Attorney, Agent, or Firm* — Rimon P.C.

(57) ABSTRACT

A vehicle serving as a first vehicle includes a communicator, an identification unit, a collector, and a notification unit. The communicator communicates with one or more second vehicles upon occurrence of a multiple-vehicle accident involving multiple vehicles. The one or more second vehicles include the vehicles involved in the multiple-vehicle accident. The identification unit uniquely identifies a vehicle that is to issue an emergency notification by communicating with the one or more second vehicles. The collector collects accident information from the one or more second vehicles when the first vehicle corresponds to the vehicle that is to issue the emergency notification. The notification unit notifies an emergency notification center of the accident information collected by the collector as notification information.

7 Claims, 4 Drawing Sheets

(56) References Cited

U.S. PATENT DOCUMENTS

| | | | | |
|---|---|---|---|---|
| 2016/0169688 A1* | 6/2016 | Kweon | ............ | G08G 1/096741 |
| | | | | 701/522 |
| 2017/0316698 A1* | 11/2017 | Stenneth | ................ | G08G 1/207 |
| 2017/0337753 A1* | 11/2017 | Joodaki | .................. | G06V 20/63 |
| 2018/0038953 A1* | 2/2018 | Choi | ..................... | G01S 13/931 |
| 2018/0176742 A1* | 6/2018 | Narayanan | ....... | G08G 1/096783 |
| 2020/0221250 A1* | 7/2020 | Whelen | .................. | H04W 4/44 |
| 2021/0129865 A1* | 5/2021 | Jeong | ..................... | G08G 1/162 |
| 2021/0192863 A1* | 6/2021 | Oswald | ..................... | G07C 5/12 |
| 2022/0138861 A1* | 5/2022 | Potter | .................... | G08B 25/00 |
| | | | | 705/4 |
| 2023/0206757 A1* | 6/2023 | Oswald | .............. | G01C 21/3492 |
| 2023/0222909 A1* | 7/2023 | Michiyama | ...... | G08G 1/096791 |
| | | | | 701/119 |

FOREIGN PATENT DOCUMENTS

| | | | | | |
|---|---|---|---|---|---|
| JP | 2001-093069 | A | | 4/2001 | |
| JP | 2010-244167 | A | | 10/2010 | |
| JP | 2013156893 | A | * | 8/2013 | |
| JP | 2020061138 | A | * | 4/2020 | ........... G08G 1/0965 |
| KR | 20090056068 | A | * | 6/2009 | ........... G08G 1/0965 |
| KR | 101861236 | B1 | * | 5/2018 | ............. G06Q 40/08 |
| KR | 20180082105 | A | * | 7/2018 | ............. H04W 4/44 |
| KR | 20190116888 | A | * | 10/2019 | ............. H04W 4/40 |
| KR | 102026911 | B1 | * | 11/2019 | ............. B60R 21/01 |

\* cited by examiner

VEHICLE

CROSS-REFERENCE TO RELATED APPLICATIONS

The present application claims priority from Japanese Patent Application No. 2022-143325 filed on Sep. 8, 2022, the entire contents of which are hereby incorporated by reference.

BACKGROUND

The disclosure relates to a vehicle.

Various vehicle notification systems have been put into practical use that causes, when an emergency such as a traffic accident or a vehicle malfunction occurs, a mobile phone, an in-vehicle phone, or another in-vehicle communication device to send an emergency notification indicating the state of the emergency via a mobile communication network.

An example of the notification systems described above is disclosed in, for example, Japanese Unexamined Patent Application Publication (JP-A) No. 2010-244167. In order to inform an emergency center of details of a contact accident, an emergency notification system disclosed in JP-A 2010-244167 includes a pedestrian accident information sensor, an occupant accident information sensor, and an accident information transmission part. The pedestrian accident information sensor detects pedestrian accident information to determine a circumstance upon contact between a pedestrian and a vehicle. The occupant accident information sensor detects occupant accident information to determine a circumstance upon occurrence of danger to an occupant due to contact of the vehicle. When detecting contact with the pedestrian, the accident information transmission part sends the pedestrian accident information to a communication device of the emergency center. When determining the occurrence of danger to the occupant, the accident information transmission part sends the occupant accident information to the communication device.

Another example of the notification systems is disclosed in, for example, JP-A No. 2001-93069. According to the notification system disclosed in JP-A No. 2001-93069, when an accident occurs outside a communication area of an in-vehicle mobile phone, emergency notification data is sent from an own vehicle to another vehicle in the communication area via a transceiver unit, and the other vehicle performs emergency notification in place of the own vehicle.

SUMMARY

An aspect of the disclosure provides a vehicle serving as a first vehicle. The vehicle includes a communicator, an identification unit, a collector, and a notification unit. The communicator is configured to communicate with one or more second vehicles upon occurrence of a multiple-vehicle accident involving multiple vehicles. The one or more second vehicles include the vehicles involved in the multiple-vehicle accident. The identification unit is configured to uniquely identify a vehicle that is to issue an emergency notification by communicating with the one or more second vehicles. The collector is configured to collect accident information from the one or more second vehicles when the first vehicle corresponds to the vehicle that is to issue the emergency notification. The notification unit is configured to notify an emergency notification center of the accident information collected by the collector as notification information.

An aspect of the disclosure provides a vehicle serving as a first vehicle. The vehicle includes a communicator and circuitry. The communicator is configured to communicate with one or more second vehicles upon occurrence of a multiple-vehicle accident involving multiple vehicles. The one or more second vehicles include the vehicles involved in the multiple-vehicle accident. The circuitry is configured to uniquely identify a vehicle that is to issue an emergency notification by communicating with the one or more second vehicles, collect accident information from the one or more second vehicles when the first vehicle corresponds to the vehicle that is to issue the emergency notification, and notify an emergency notification center of the accident information collected as notification information.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

As described in JP-A No. 2010-244167, upon occurrence of an accident involving vehicles, information about details of the accident is to be provided to an emergency notification center.

However, when another vehicle sends emergency notification in place of an own vehicle in an uncommunicable state upon the occurrence of an accident involving multiple vehicles and people as described in JP-A No. 2001-93069, multiple pieces of accident information similar to each other are sent from the multiple vehicles, including the vehicle which has caused the accident, to the emergency notification center, causing temporary transmission congestion.

Such a condition generates the necessity for the emergency notification center to distinguish the multiple pieces of accident information from each other, i.e., determine whether the pieces of accident information is identical to each other. This can hinder prompt determination or prompt processing.

It is desirable to provide a vehicle that makes it possible to secure prompt and accurate information transmission while preventing transmission congestion of accident information from occurring upon occurrence of a multiple-vehicle accident involving multiple vehicles.

Example Embodiment

In the following, a vehicle 100 according to an example embodiment of the disclosure is described with reference to FIGS. 1 to 4.

The following description of the vehicle 100 according to the example embodiment is given with reference to an exemplary configuration of an emergency notification system 1.

Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

<Exemplary Configuration of Emergency Notification System 1>

Figure 1:
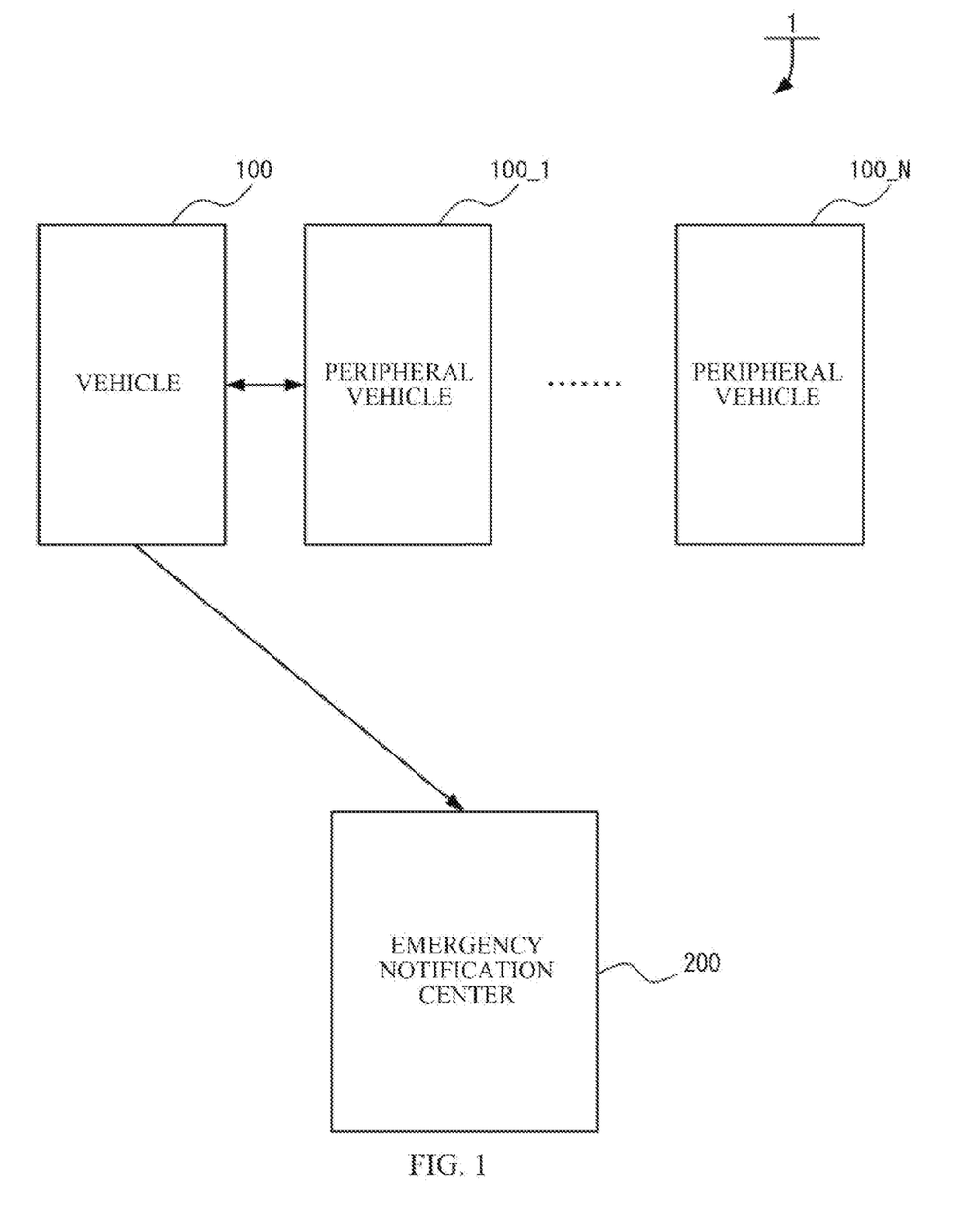
FIG. 1 is a block diagram illustrating an exemplary configuration of an emergency notification system including vehicles according to one example embodiment of the disclosure.

As illustrated in FIG. 1, the emergency notification system 1 according to the present example embodiment includes a vehicle 100, one or more peripheral vehicles 100_1 to 100_N, and an emergency notification center 200. In one embodiment, the vehicle 100 may serve as a "first vehicle". In one embodiment, the one or more peripheral vehicles may each serve as a "second vehicle".

The vehicle 100 is communicable with the peripheral vehicles 100_1 to 100_N.

Further, the vehicle 100 may be communicable with other vehicles irrelevant to an accident concerned as long as the other vehicles are in a specific communication area, for example.

In the present example embodiment, when the accident occurred is a multiple-vehicle accident involving multiple vehicles, the vehicle 100 communicates with the peripheral vehicles 100_1 to 100_N present near the site of the accident to collect accident information to generate notification information, and causes an identified one of the vehicle 100 and the peripheral vehicles 100_1 to 100_N to send the notification information on the accident to the emergency notification center 200.

In one example, the emergency notification center 200 may include a server. The emergency notification center 200 may receive the notification information from the identified one of the vehicle 100 and the peripheral vehicles 100_1 to 100_N, and may notify a person in charge in a facility provided with the server (i.e., the emergency notification center 200) of the information on the contact accident. When receiving the notification, the person in charge may send a notification to a fire station, a police station, or a hospital selected depending on the details of the accident.

<Exemplary Configuration of Vehicle 100>

Figure 2:
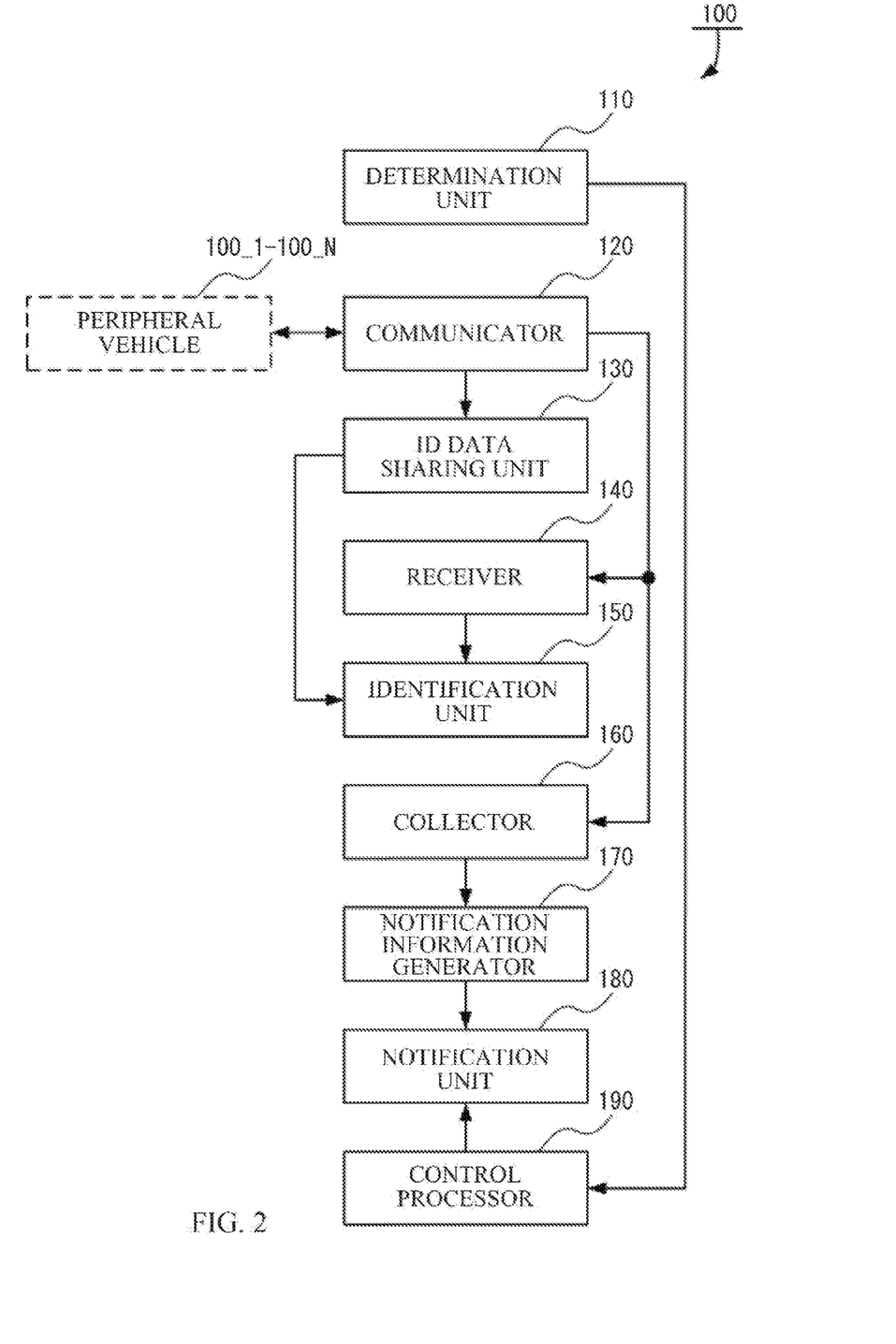
FIG. 2 is a block diagram illustrating an exemplary configuration of a vehicle according to one example embodiment of the disclosure.

As illustrated in FIG. 2, the vehicle 100 according to the present example embodiment may include a determination unit 110, a communicator 120, an identification (ID) data sharing unit 130, a receiver 140, an identification unit 150, a collector 160, a notification information generator 170, a notification unit 180, and a control processor 190.

The determination unit 110 may determine whether the accident occurred is a multiple-vehicle accident involving the vehicle 100 and some of the peripheral vehicles 100_1 to 100_N.

In one example, the determination unit 110 may determine whether an accident occurred is a multiple-vehicle accident based on information received from not only the vehicles involved in the accident and portable devices owned by occupants of the vehicles involved in the accident, but also vehicles in a peripheral communicable area (the specific communication area).

For example, the determination unit 110 may determine whether the accident occurred is the multiple-vehicle accident, based on image data acquired by the vehicle 100 and the peripheral vehicles 100_1 to 100_N and information on posts on social media or the like posted by the portable devices owned by the occupants of the vehicle 100 and the peripheral vehicles 100_1 to 100_N.

The communicator 120 may be a communication module that communicates with the peripheral vehicles 100_1 to 100_N, for example. The communication may be established by a communication method that enables communication in a limited area, such as Wi-Fi (registered trademark) or Bluetooth (registered trademark), for example.

The communicator 120 may send the information received through the communication with the peripheral vehicles 100_1 to 100_N to the ID data sharing unit 130, the receiver 140, the collector 160, and the control processor 190 to be described later, for example.

The ID data sharing unit 130 may share ID data unique to each of the vehicles between the vehicle 100 and the peripheral vehicles 100_1 to 100_N communicating with the vehicle 100.

The ID data may be a MAC address of Wi-Fi or a vehicle identification number (VIN) unique to each of the vehicle 100 and the peripheral devices 100_1 to 100_N, for example. The ID data sharing unit 130 may store the ID data of the vehicles in the form of a list, for example.

The receiver 140 may receive information regarding notification capability of the peripheral vehicles 100_1 to 100_N including the vehicle involved in the accident, i.e., information regarding whether the peripheral vehicles 100_1 to 100_N including the vehicle involved in the accident are able to send the notification information.

The notification capability information may include data indicating the presence of a malfunction of a device used to send the notification information to the emergency notification center 200, such as a microphone or a speaker, for example. The notification capability information may further include data, received from the peripheral vehicles 100_1 to 100_N, indicating that the occupant in a specific vehicle is in a severe state and thus unable to send the notification information to the emergency notification center 200, for example.

The identification unit 150 uniquely identifies a vehicle that is to issue an emergency notification by communicating with the peripheral vehicles 100_1 to 100_N including the vehicle involved in the accident. In one example, the identification unit 150 may identify the vehicle that is to issue the emergency notification by sorting the ID data of the peripheral vehicles 100_1 to 100_N, including the vehicle involved in the accident, in ascending order and identifying the vehicle ranked at the first place as the vehicle that is to issue the emergency notification to the emergency notification center 200.

Note that, even when the identification unit 150 identifies the vehicle that is to issue the emergency notification to the emergency notification center 200 as described above, the identification unit 150 may uniquely identify the vehicle that is to issue the emergency notification, based on the notification capability information sent from the peripheral devices 100_1 to 100_N including the vehicle involved in the accident to the receiver 140.

When the vehicle 100, which is an own vehicle, is the vehicle that is to issue the emergency notification, the collector 160 collects accident information from the peripheral vehicles 100_1 to 100_N including the vehicles involved in the accident.

The accident information collected by the collector 160 may be outputted to the notification information generator 170 to be described later.

The notification information generator 170 may sort out the accident information collected by the collector 160 to thereby generate the notification information. Herein, the term "sort out" may encompass excluding the same accident information from the accident information collected from the peripheral vehicles 100_1 to 100_N and combining multiple pieces of accident information collected from the peripheral vehicles 100_1 to 100_N to enhance the accuracy of the information on the number of vehicles involved in the accident or the number of injured people, for example.

The notification unit 180 may notify the emergency notification center 200 of the notification information generated by the notification information generator 170.

The control processor 190 may control an overall operation of the vehicle 100 in accordance with a control program stored in a non-illustrated read only memory (ROM), for example. In the present example embodiment, when the determination unit 110 determines that the accident occurred is a multi-vehicle accident involving multiple vehicles, the control processor 190 may activate the communicator 120, the ID data sharing unit 130, the receiver 140, the identification unit 150, the collector 160, the notification information generator 170, and the notification unit 180.

<Exemplary Configuration of Emergency Notification Center 200>

Figure 3:
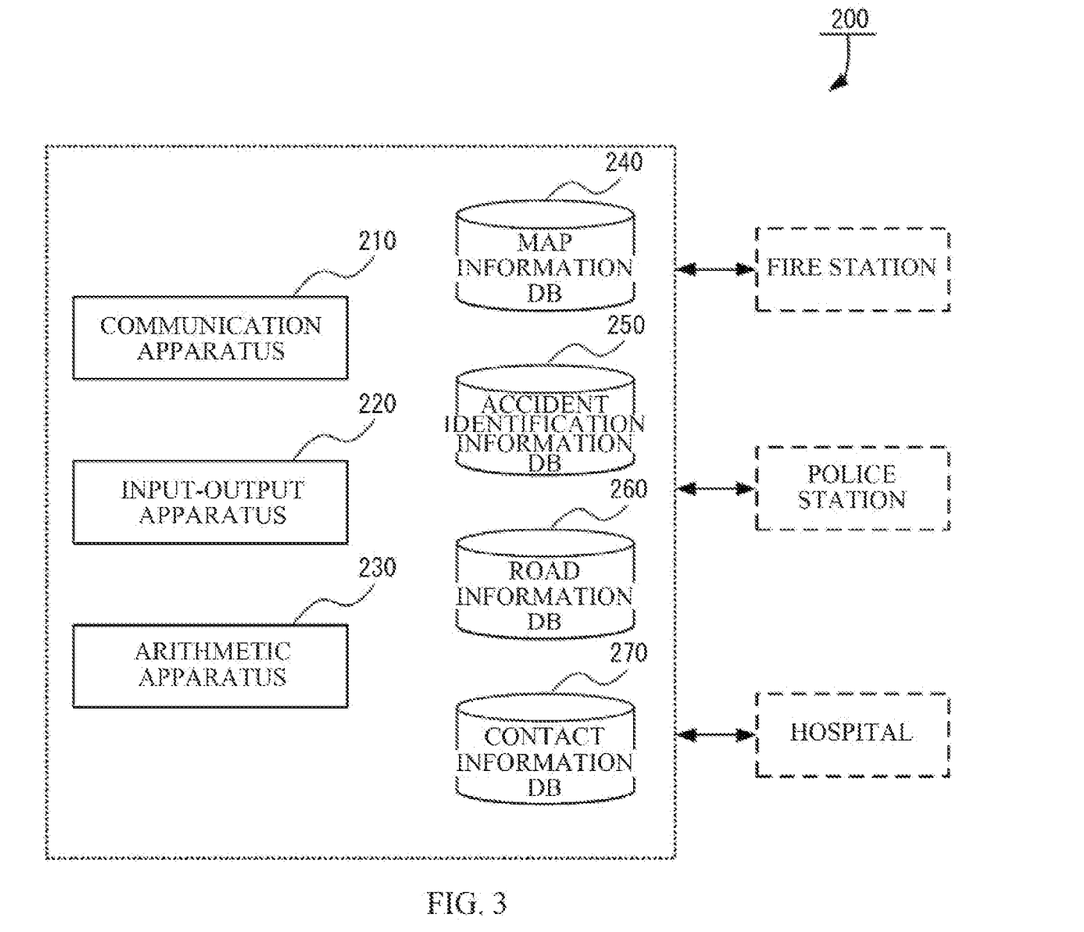
FIG. 3 is a block diagram illustrating an exemplary configuration of an emergency notification center according to one example embodiment of the disclosure.

As illustrated in FIG. 3, the emergency notification center 200 according to the present example embodiment may include the server that includes a communication apparatus 210, an input-output apparatus 220, an arithmetic apparatus 230, a map information database (DB) 240, an accident identification information database (DB) 250, a road information database (DB) 260, and a contact information database (DB) 370.

The communication apparatus 210 may be an apparatus configured to establish a radio communication with the vehicle 100 or the peripheral vehicles 100_1 to 100_N. In one example, the communication apparatus 310 may receive emergency notifications from the vehicle 100 or the peripheral vehicles 100_1 to 100_N.

The input-output apparatus 220 may be operated by a person in charge on the server side when data is inputted to the server or outputted from the server, for example. The input-output apparatus 320 may be a keyboard or a monitor, for example.

The arithmetic apparatus 230 may perform various calculations to control operations of various components in the server, for example.

The map information DB 240 may store map information. The map information DB 240 may be used when the arithmetic apparatus 230 identifies current positions of the vehicle 100 or the peripheral vehicles 100_1 to 100_N based on notifications from the vehicle 100 or the peripheral vehicles 100_1 to 100_N, for example.

The accident identification information DB 250 may be an accumulation of data for identifying a specific circumstance of an accident. For example, the accident identification information DB 250 may store data on the relation between a vehicle speed V [km/h] and a contact energy E [J]. The accident identification information DB 250 may be used when specific details of an accident are to be identified based on sensor values of various sensors mounted in the vehicle 100, for example.

The road information DB 260 may be an accumulation of data on traffic congestion and road construction work. The road information DB 360 may be used when the arithmetic apparatus 230 is to provide one or more of a fire station, a police station, and a hospital with a route to the site of the accident, for example.

The contact information DB 270 may be an accumulation of contact information on facilities relevant to accidents, such as fire stations, police stations, and hospitals. The contact information DB 370 may be used when the person in charge in the emergency notification center 300 is to make contact with the facilities described above.

<Process in Vehicle 100>

Figure 4:
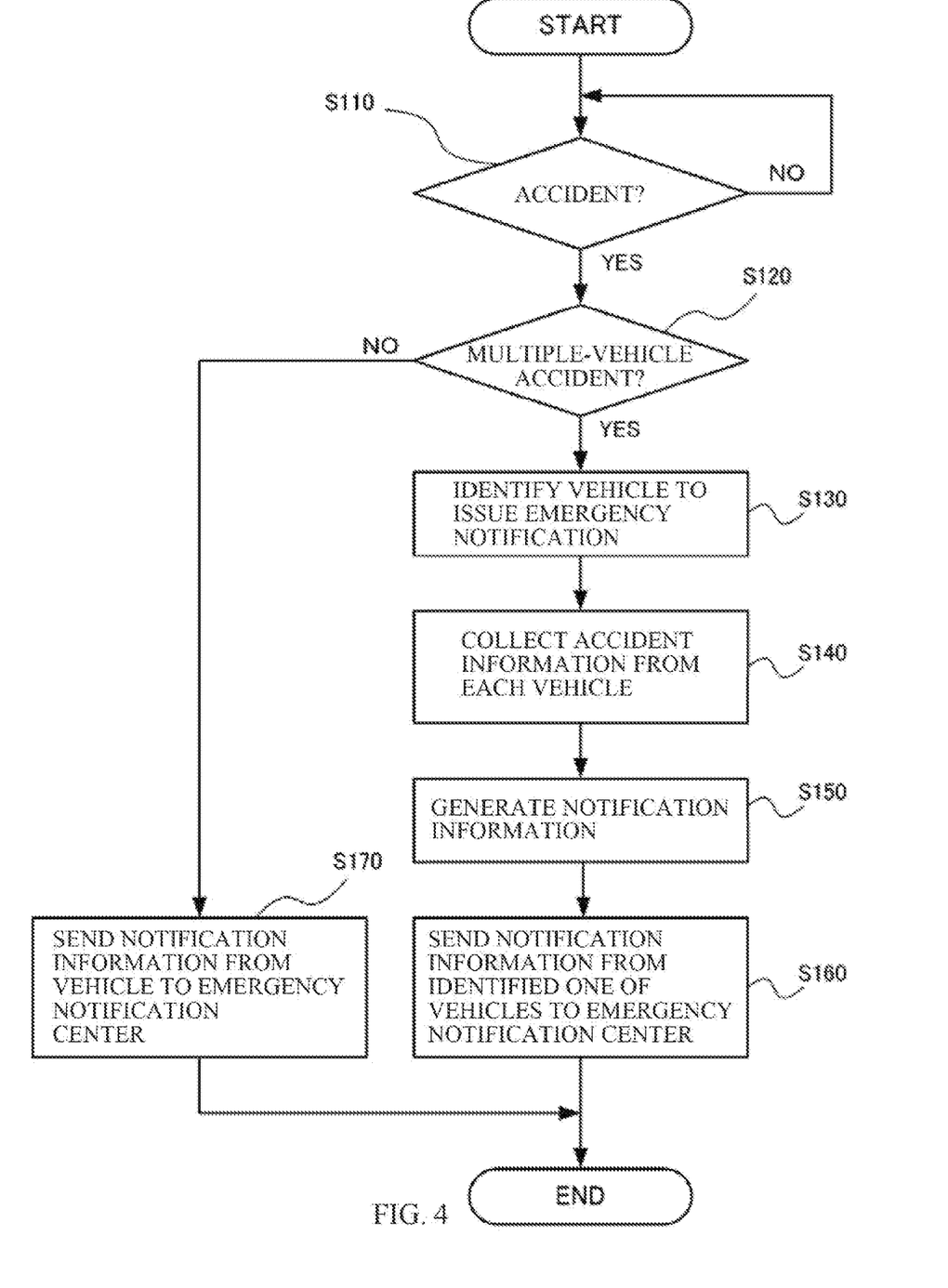
FIG. 4 is a flowchart of an exemplary procedure of a process to be performed in an emergency notification system including vehicles according to one example embodiment of the disclosure.

With reference to FIG. 4, a description is given of an exemplary procedure of a process to be performed in the vehicle 100 according to the present example embodiment.

As illustrated in FIG. 4, the control processor 190 may determine whether an accident has occurred (Step S110). When the control processor 190 determines that no accident has occurred (Step S110: NO), the procedure may return to a stand-by mode.

In contrast, when the control processor 190 determines that an accident has occurred (Step S110: YES), the determination unit 110 may determine whether the accident is a multiple-vehicle accident involving multiple vehicles (Step S120). When the determination unit 110 determines that the accident is not the multiple-vehicle accident (Step S120: NO), the vehicle having caused the accident may send the notification information to the emergency notification center 200, following which the procedure may end.

In contrast, when the determination unit 110 determines that the accident is the multiple-vehicle accident involving multiple vehicles (Step S120: YES), the identification unit 150 may identify the vehicle that is to issue the emergency notification to the emergency notification center 200 (Step S130).

Thereafter, the collector 160 of the vehicle identified by the identification unit 150 as the vehicle that is to issue the emergency notification to the emergency notification center 200 may collect the accident information from the peripheral vehicles 100_1 to 100_N including the vehicle involved in the accident (Step S140). The accident information collected by the collector 160 may be outputted to the notification information generator 170.

Thereafter, the notification information generator 170 of the vehicle identified by the identification unit 150 as the vehicle that is to issue the emergency notification to the emergency notification center 200 may sort out the accident information collected by the collector 160 to thereby generate the notification information (Step S150).

The notification unit 180 of the vehicle identified by the identification unit 150 as the vehicle that is to issue the emergency notification to the emergency notification center 200 may send the notification information on the accident, which is generated by the notification information generator 170, to the emergency notification center 200 (Step S160), following which the procedure may end.

Workings and Effects

According to the example embodiment described above, upon the occurrence of a multiple-vehicle accident involving multiple vehicles, the communicator 120 of the vehicle 100 in the emergency notification system 1 communicates with the peripheral vehicles 100_1 to 100_N including a vehicle involved in the accident, and the identification unit 150 of the vehicle 100 uniquely identifies the vehicle that is to issue the emergency notification.

The vehicle 100 may include the ID data sharing unit 130 that shares the ID data unique to each of the vehicles between the vehicle 100 and the peripheral vehicles 100_11 to 100_N communicating with the vehicle 100. The identification unit 150 may identify the vehicle that is to issue the emergency notification by sorting the shared ID data of the vehicle 100 and the peripheral vehicles 100_1 to 100_N in ascending order and identifying the vehicle ranked at the first place as the vehicle that is to issue the emergency notification.

That is, upon the occurrence of a multiple-vehicle accident involving multiple vehicles, the ID data sharing unit 130 may share the ID data, acquired by communicating with the peripheral vehicles 100_1 to 100_N, in the form of a list between the vehicle 100 and the peripheral vehicles 100_1 to 100_N, for example, and the identification unit 150 uniquely identifies the vehicle that is to issue the emergency notification in accordance with a predetermined rule.

Accordingly, upon the occurrence of a multiple-vehicle accident involving multiple vehicles, it is possible to secure prompt and accurate information transmission while preventing information transmission congestion.

Further, even when the identification unit 150 uniquely identifies the vehicle that is to issue the emergency notification in accordance with the rule described above, the identification unit 150 may uniquely identify the vehicle that is to issue the emergency notification based on the notification capability information sent from the peripheral vehicles 100_1 to 100_N, including the vehicle involved in the accident, to the receiver 140.

Accordingly, upon the occurrence of a multiple-vehicle accident involving multiple vehicles, it is possible to secure prompt and accurate information transmission while preventing information transmission congestion in view of various circumstances of the peripheral vehicles 100_1 to 100_N including the vehicle involved in the accident.

Further, when the vehicle 100, which is the own vehicle, corresponds to the vehicle that is to issue the emergency notification, the collector 160 of the vehicle 100 in the emergency notification system 1 according to the foregoing example embodiment collects the accident information from the peripheral vehicles 100_1 to 100_N including the vehicle involved in the accident.

That is, it is possible to collect the data on the multiple-vehicle accident in such a large amount that the vehicle 100 by itself is unable to collect.

Accordingly, it is possible for the emergency notification center 200 to collect the data on the multiple-vehicle accident involving multiple vehicles in an amount sufficiently enough to recognize details of the multiple-vehicle accident. This helps to urge the emergency notification center 200 to take a prompt and accurate measure against the accident.

Further, the notification information generator 170 of the vehicle 100 in the emergency notification system 1 according to the foregoing example embodiment may sort out the collected accident information to thereby generate the notification information, and the notification unit 180 may notify the emergency notification center 200 of the notification information generated by the notification information generator 170.

Herein, the process of sorting out the collected accident information to be performed by the notification information generator 170 may include excluding the same accident information from the accident information collected from the peripheral vehicles 100_1 to 100_N and combining multiple pieces of the accident information collected from the peripheral vehicles 100_1 to 100_N to enhance the accuracy of the information on the number of vehicles involved in the accident or the number of injured people, for example.

Accordingly, upon the occurrence of a multiple-vehicle accident involving multiple vehicles, it is possible to secure prompt and accurate information transmission while preventing information transmission congestion.

In addition, the vehicle identified by the identification unit 150 as the vehicle that is to issue the emergency notification may send the emergency notification to the emergency notification center 200. It is therefore possible to send accurate information in an optimal data volume to the emergency notification center 200.

Further, the collected accident information may be sorted out before being sent from the identified vehicle to the emergency notification center 200. It is therefore possible to secure prompt and accurate information transmission without imposing a load on a communication band.

Modification Example 1

In the foregoing example embodiment, the identification unit 150 uniquely identifies the vehicle that is to issue the emergency notification by communicating with the peripheral vehicles 100_1 to 100_N including the vehicle involved in the accident. The identification unit 150 may identify the vehicle that is to issue the emergency notification by sorting the shared ID data of the vehicle 100 and the peripheral vehicles 100_1 to 100_N in ascending order and identifying the vehicle ranked at the first place as the vehicle that is to issue the emergency notification. However, according to Modification Example 1, the vehicle that is to issue the emergency notification may be identified by collecting data on vehicle body damage from respective sensors of the vehicle 100 and the peripheral vehicles 100_1 to 100_N, estimating the degree of the damage of each vehicle based on the collected data, and identifying the vehicle with the least degree of damage as the vehicle that is to issue the emergency notification to the emergency notification center 200.

Modification Example 2

Alternatively, each of the vehicles may determine the states of the vehicle 100, which is the own vehicle, and the peripheral vehicles 100_1 to 100_N, and the states of the occupants in the vehicle 100 and the peripheral vehicles 100_1 to 100_N based on accident circumstance information and vehicle damage information collected from sensors, and information indicating that the vehicle 100 is going to send the emergency notification to the emergency notification center 200 may be transmitted to each of the vehicles via communication, for example.

Note that it is possible to implement the vehicle 100 of the example embodiments of the disclosure by recording the processes to be executed by, for example, the control processor 190 on a non-transitory recording medium readable by a computer system, and causing, for example, the control processor 190 to load the programs recorded on the non-transitory recording medium thereon to execute the programs. The computer system as used herein may encompass an operating system (OS) and hardware such as a peripheral device.

Further, the program may be directed to implement a part of the operation described above. The program may be a so-called differential file (differential program) configured to implement the operation by a combination of a program already recorded on the computer system.

Further, the program may be directed to implement a part of the operation described above. The program may be a so-called differential file (differential program) configured to implement the operation by a combination of a program already recorded on the computer system.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

One or more of the identification unit 150, the collector 160, and the notification unit 180 in FIG. 2 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the identification unit 150, the collector 160, and the notification unit 180. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the identification unit 150, the collector 160, and the notification unit 180 in FIG. 2.

The invention claimed is:

1. A vehicle serving as a first vehicle, the vehicle comprising:
   a communicator configured to communicate with one or more second vehicles upon occurrence of a multiple-vehicle accident involving multiple vehicles, the one or more second vehicles including the vehicles involved in the multiple-vehicle accident;
   an identification unit configured to uniquely identify a vehicle that is to issue an emergency notification by communicating with the one or more second vehicles;
   a collector configured to collect accident information from the one or more second vehicles when the first vehicle corresponds to the vehicle that is to issue the emergency notification; and
   a notification unit configured to notify an emergency notification center of the accident information collected by the collector as notification information.

2. The vehicle according to claim 1, further comprising an identification data sharing unit configured to share identification data unique to each of the first vehicle and the one or more second vehicles between the first vehicle and the one or more second vehicles communicating with the first vehicle, wherein
   the identification unit is configured to sort the identification data shared between the first vehicle and the one or more second vehicles in ascending order and identify one of the first vehicle and the one or more second vehicles ranked at a first place as the vehicle that is to issue the emergency notification.

3. The vehicle according to claim 2, further comprising a receiver configured to receive notification capability information from the one or more second vehicles, wherein
   the identification unit is configured to uniquely identify the vehicle that is to issue the emergency notification based on the notification capability information sent from the one or more second vehicles to the receiver.

4. The vehicle according to claim 3, further comprising a notification information generator configured to generate the notification information by sorting out the accident information collected by the collector.

5. The vehicle according to claim 2, further comprising a notification information generator configured to generate the notification information by sorting out the accident information collected by the collector.

6. The vehicle according to claim 1, further comprising a notification information generator configured to generate the notification information by sorting out the accident information collected by the collector.

7. A vehicle serving as a first vehicle, the vehicle comprising:
   a communicator configured to communicate with one or more second vehicles upon occurrence of a multiple-vehicle accident involving multiple vehicles, the one or more second vehicles including the vehicles involved in the multiple-vehicle accident; and
   circuitry configured to
   uniquely identify a vehicle that is to issue an emergency notification by communicating with the one or more second vehicles,
   collect accident information from the one or more second vehicles when the first vehicle corresponds to the vehicle that is to issue the emergency notification, and
   notify an emergency notification center of the accident information collected as notification information.

* * * * *